United States Patent
Sakai et al.

(10) Patent No.: US 10,807,552 B2
(45) Date of Patent: Oct. 20, 2020

(54) VEHICLE SEAT DEVICE

(71) Applicants: AISIN SEIKI KABUSHIKI KAISHA, Kariya-shi (JP); TOYOTA JIDOSHA KABUSHIKI KAISHA, Toyota-shi (JP)

(72) Inventors: Makoto Sakai, Anjo (JP); Ryosuke Mizuno, Toyota (JP); Tomokazu Seki, Kariya (JP); Katsuya Nozue, Toyohashi (JP); Shunsuke Tanaka, Nisshin (JP); Kenji Hashimoto, Nisshin (JP)

(73) Assignees: AISIN SEIKI KABUSHIKI KAISHA, Kariya-shi (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 99 days.

(21) Appl. No.: 16/325,202

(22) PCT Filed: Aug. 8, 2017

(86) PCT No.: PCT/JP2017/028746
§ 371 (c)(1),
(2) Date: Feb. 13, 2019

(87) PCT Pub. No.: WO2018/037909
PCT Pub. Date: Mar. 1, 2018

(65) Prior Publication Data
US 2019/0193663 A1    Jun. 27, 2019

(30) Foreign Application Priority Data

Aug. 24, 2016  (JP) ................... 2016-163308

(51) Int. Cl.
*B60R 21/215* (2011.01)
*B60N 2/64* (2006.01)
(Continued)

(52) U.S. Cl.
CPC ......... *B60R 21/215* (2013.01); *B60N 2/427* (2013.01); *B60N 2/64* (2013.01); *B60N 2/68* (2013.01);
(Continued)

(58) Field of Classification Search
CPC .......... B60R 21/215; B60R 21/207; B60R 2021/161; B60N 2/64; B60N 2/68; B60N 2/427
(Continued)

(56) References Cited

U.S. PATENT DOCUMENTS

| | | | |
|---|---|---|---|
| 6,129,419 A * | 10/2000 | Neale ................ | B60N 2/58 297/284.4 |
| 9,358,909 B2 * | 6/2016 | Jeong ................ | B60N 2/99 |

(Continued)

FOREIGN PATENT DOCUMENTS

JP    2014-151822 A    8/2014

OTHER PUBLICATIONS

International Search Report dated Oct. 3, 2017 in PCT/JP2017/028746 filed on Aug. 8, 2017.

*Primary Examiner* — Paul N Dickson
*Assistant Examiner* — Kurtis Nielson
(74) *Attorney, Agent, or Firm* — Oblon, McClelland, Maier & Neustadt, L.L.P.

(57) ABSTRACT

A vehicle seat device includes a fixed base, a movable base, a paddle, and an air pack. When a side airbag arranged in the seat is deployed, the expanding side airbag presses and pivots the movable base and allows for a deployment of the side airbag. The paddle is configured to change a seat support form when pressed and pivoted by the air pack. The movable base pivots about a first pivot axis relative to the fixed base. The paddle pivots about a second pivot axis relative to the movable base. The first pivot axis and the second pivot axis are arranged at different locations.

5 Claims, 9 Drawing Sheets

(51) Int. Cl.
  *B60N 2/68* (2006.01)
  *B60N 2/427* (2006.01)
  *B60R 21/207* (2006.01)
  *B60R 21/16* (2006.01)

(52) U.S. Cl.
  CPC ...... *B60R 21/207* (2013.01); *B60R 2021/161* (2013.01)

(58) Field of Classification Search
  USPC .................................................. 280/728.3
  See application file for complete search history.

(56) References Cited

U.S. PATENT DOCUMENTS

| | | | |
|---|---|---|---|
| 9,896,007 B2 * | 2/2018 | Ohno | B60N 2/885 |
| 10,272,866 B2 * | 4/2019 | Hiraiwa | B60N 2/99 |
| 2008/0136237 A1 * | 6/2008 | Kayumi | B60N 2/914 |
| | | | 297/284.9 |
| 2012/0043791 A1 * | 2/2012 | Kojima | B60R 21/207 |
| | | | 297/216.13 |
| 2013/0169010 A1 * | 7/2013 | Sugiyama | B60N 2/42745 |
| | | | 297/216.13 |
| 2015/0360636 A1 | 12/2015 | Kaneko et al. | |
| 2016/0152203 A1 * | 6/2016 | Wiegelmann | B60N 2/58 |
| | | | 280/730.2 |
| 2019/0023217 A1 * | 1/2019 | Ohno | B60R 21/233 |

\* cited by examiner

VEHICLE SEAT DEVICE

TECHNICAL FIELD

The present invention relates to a vehicle seat device.

BACKGROUND ART

In the prior art, a vehicle seat device may include air packs (bladders) arranged inside a seat that are inflated and deflated so as to change the form of a support of the seat. Patent document 1 describes an example of a seat device including a clip (fixed portion), a base bracket (movable portion), a paddle, and an air pack. The clip is fixed to a structural body of the seat. The base bracket is pivotally coupled to the clip. The paddle is pivotally coupled to the fixed portion about the same pivot axis as the base bracket. The air pack is inflated and deflated between the paddle and the base bracket.

With this seat device, when the air pack, which is arranged between the base bracket and the paddle, is inflated, the air pack presses and pivots the paddle. Then, the paddle presses a cushion pad from the inner side to change the form of a support of the seat.

Further, when a side airbag, which is arranged in the seat, is deployed, the base bracket is pressed by the expanding side airbag and pivoted together with the paddle and the air pack. This allows for deployment of the side airbag.

PRIOR ART LITERATURE

Patent Literature

Patent Document 1: Japanese Laid-Open Patent Publication No. 2014-151822

SUMMARY OF THE INVENTION

Problem to be Solved by the Invention

When the side airbag is deployed, the side airbag needs to be expanded quickly and smoothly. In this regard, it is preferred that the base bracket of the conventional seat device be greatly moved so as not to interfere with the deployment action of the side airbag. Nevertheless, when adjusting the seat support form, it is desired that the paddle, which presses against the seat upholstery from the inner side, be moved as finely as possible. It is difficult for the structure of the prior art to solve the two problems. In this regard, there is room for improvement.

One object of the present invention is to provide a vehicle seat device that ensures quick and smooth deployment action of a side airbag and allows for adjustment of the seat support form in a further preferred manner.

Means for Solving the Problem

A vehicle seat device that achieves the above object according to one embodiment of the present disclosure includes a fixed base, a movable base, a paddle, and an air pack. The fixed base is fixed to a structural body of a seat. The movable base is pivotally coupled to the fixed base. The paddle is pivotally coupled to the movable base. The air pack is inflated and deflated between the movable base and paddle. When a side airbag arranged in the seat is deployed, the expanding side airbag presses and pivots the movable base and allows for a deployment of the side airbag. The paddle is configured to change a seat support form when pressed and pivoted by the air pack. The movable base pivots about a first pivot axis relative to the fixed base. The paddle pivots about a second pivot axis relative to the movable base. The first pivot axis and the second pivot axis are arranged at different locations.

EMBODIMENTS OF THE INVENTION

One embodiment of a vehicle seat device that has a pneumatic seat support function will now be described with reference to the drawings.

Figure 1:
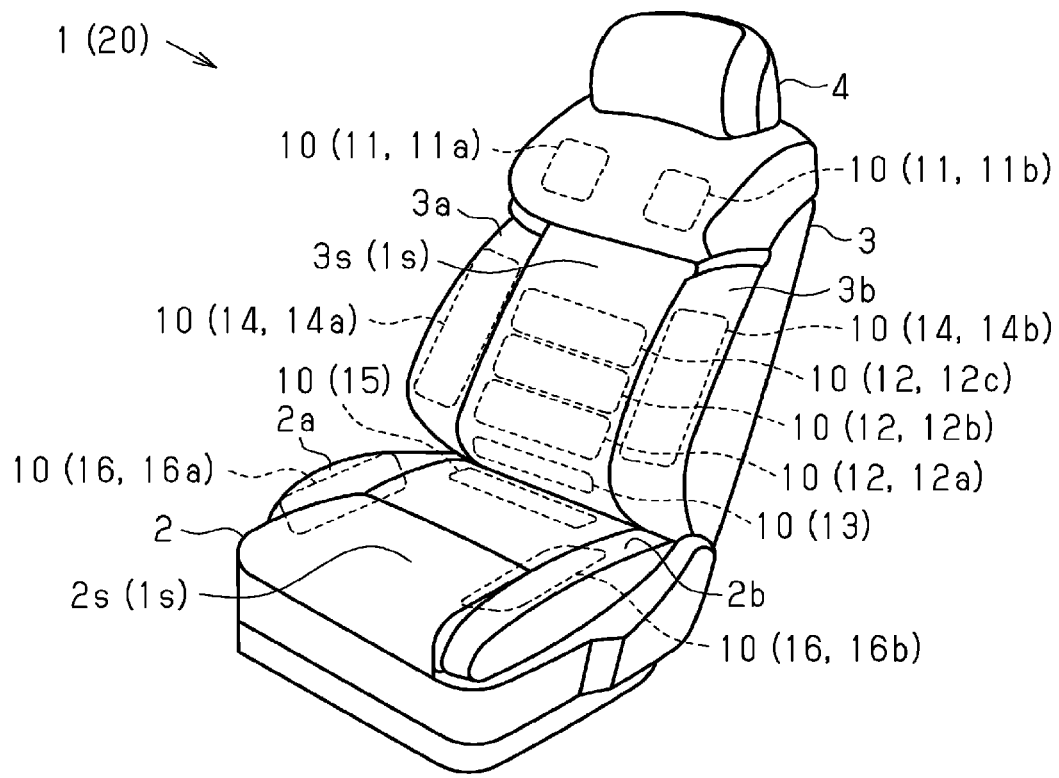
FIG. 1 is a perspective view of a vehicle seat according to one embodiment of the present invention including air packs.

As shown in FIG. 1, a vehicle seat 1 includes a seat cushion 2 and a seat back 3 arranged at a rear end of the seat cushion 2. Further, the seat back 3 includes an upper end where a head rest 4 is arranged.

With the seat 1 of the present embodiment, the seat back 3 includes side portions 3*a* and 3*b* that are bulged forward. Further, the seat cushion 2 also includes side portions 2*a* and 2*b* that are bulged upward. This allows the seat 1 of the present embodiment to be set in a desirable seating position for a vehicle occupant and maintain the seating position.

The seat 1 includes a plurality of air packs 10 (11 to 16) inside the seat cushion 2 and the seat back 3. Specifically, with the seat 1 of the present embodiment, the seat back 3 includes a backrest surface 3*s* and independent air packs 11, 12, 13, and 14. The air packs 11 (11*a* and 11*b*) are arranged inside the seat back 3 at locations corresponding to a shoulder portion (shoulder) of the backrest surface 3*s*, the air packs 12 (12*a* to 12*c*) are arranged inside the seat back 3 at locations corresponding to a waist portion (lumbar) of the backrest surface 3*s*, the air pack 13 is arranged inside the seat back 3 at a location corresponding to a lower end portion (back pelvis) of the backrest surface 3*s*, and the air packs 14 (14a and 14b) are arranged inside the seat back 3 at locations corresponding to the side portions 3a and 3b. Further, the seat cushion 2 includes a seating surface 2s and independent air packs 15 and 16. The air pack 15 is arranged at an inner side of a rear end portion (cushion pelvis) of the seating surface 2s, and the air packs 16 (16a and 16b) are respectively arranged at an inner side of the side portions 2a and 2b of the seating surface 2s. Accordingly, in the seat 1 of the present embodiment, a seat device 20 has a seat support form that can be changed by inflating and deflating the air packs 10.

Figure 2:
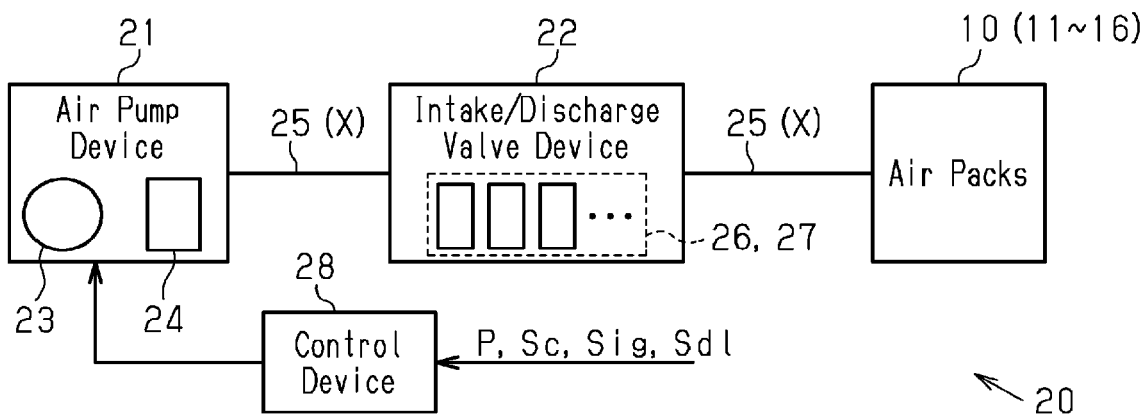
FIG. 2 is a schematic diagram of a seat device shown in FIG. 1.

As shown in FIG. 2, the seat device 20 of the present embodiment includes an air pump device 21 and an intake/discharge valve device 22. The air pump device 21 sends pressurized air to the air packs 10. The intake/discharge valve device 22 is arranged between the air packs 10 and the air pump device 21. The air pump device 21 of the present embodiment includes an electric pump of which the drive source is a motor 23 to drive a pump mechanism 24. Further, the intake/discharge valve device 22 is connected to the air packs 10 and the air pump device 21 with flexible resin tubes 25. In the seat device 20 of the present embodiment, the tubes 25 and an inner passage of the intake/discharge valve device 22 form an air passage X that is in communication with the air packs 10 and the air pump device 21. Further, the intake/discharge valve device 22 of the present embodiment includes an intake valve 26 and a discharge valve 27 that are located in the passage X.

In the seat device 20 of the present embodiment, a control device 28 controls the actuation of the intake valve 26, the discharge valve 27, and the air pump device 21. Specifically, the control device 28 in the present embodiment receives signals including a signal indicating an inner pressure P of each of the air packs 10, an operation input signal Sc generated in correspondence with an input to an operation switch (not shown), an ignition signal Sig, and a door lock signal Sdl. Based on the input signals, the control device 28 in the present embodiment is configured to control the actuation of the intake valve 26, the discharge valve 27, and the air pump device 21 to inflate and deflate the air packs 10.

Figure 3:
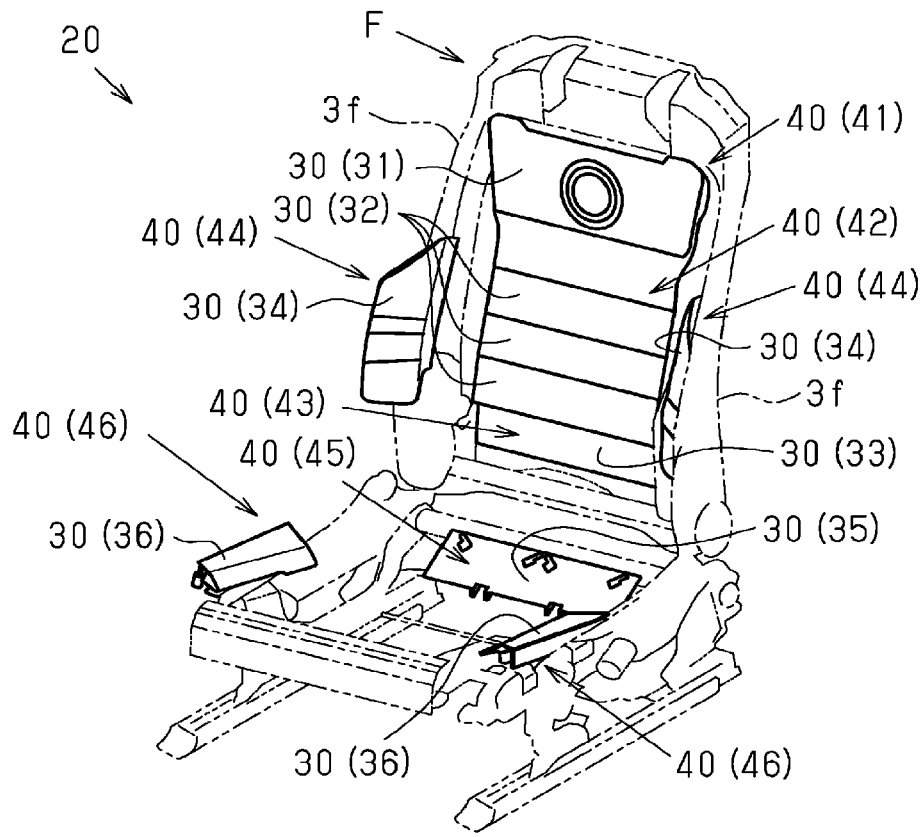
FIG. 3 is a perspective view of a support assembly arranged in the seat shown in FIG. 2.
Figure 4:
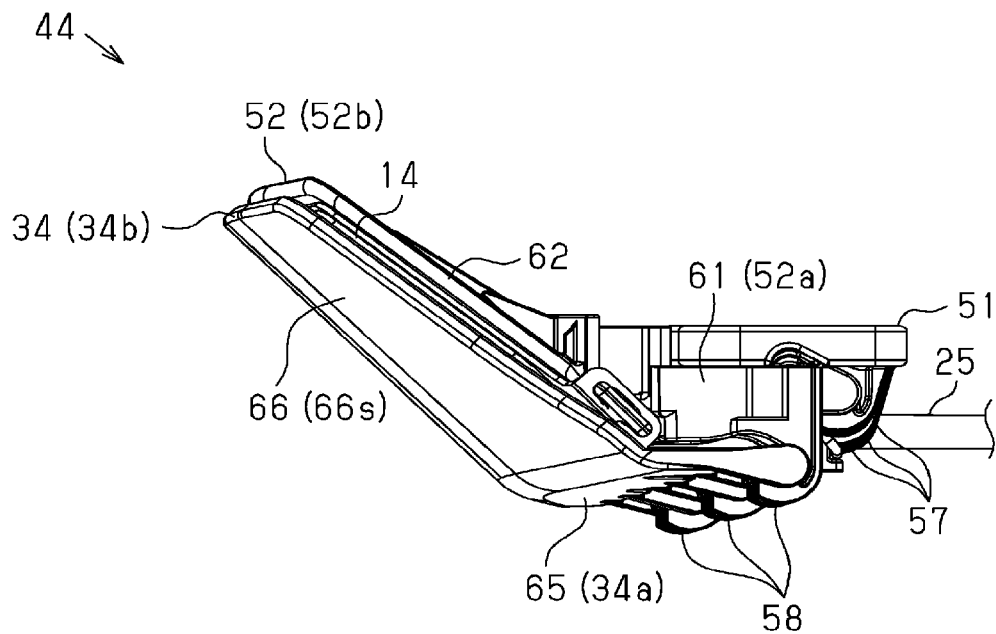
FIG. 4 is a top view of a back side support assembly (BS support assembly) shown in FIG. 3.
Figure 5:
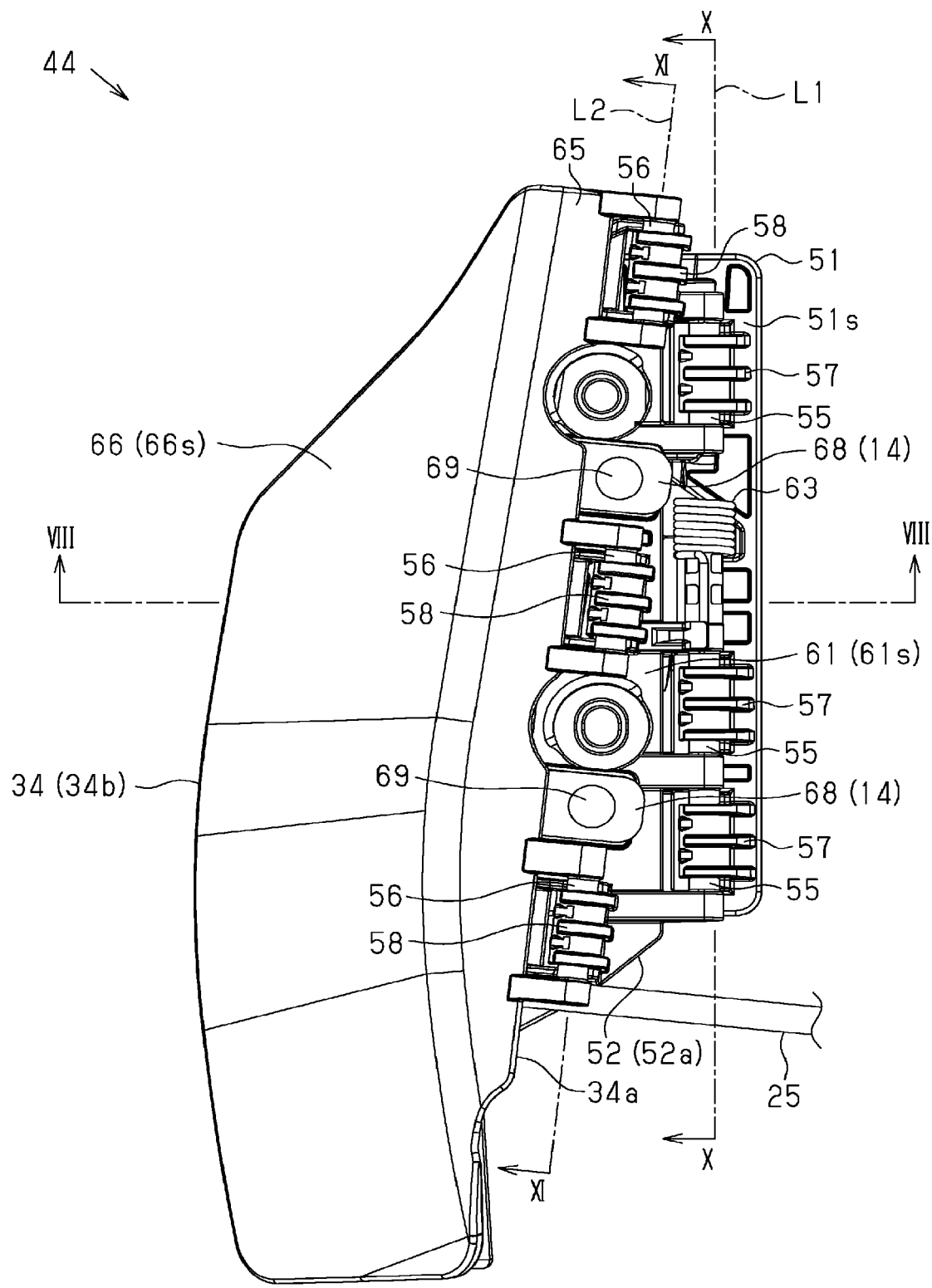
FIG. 5 is a side view of the BS support assembly shown in FIG. 4.
Figure 6:
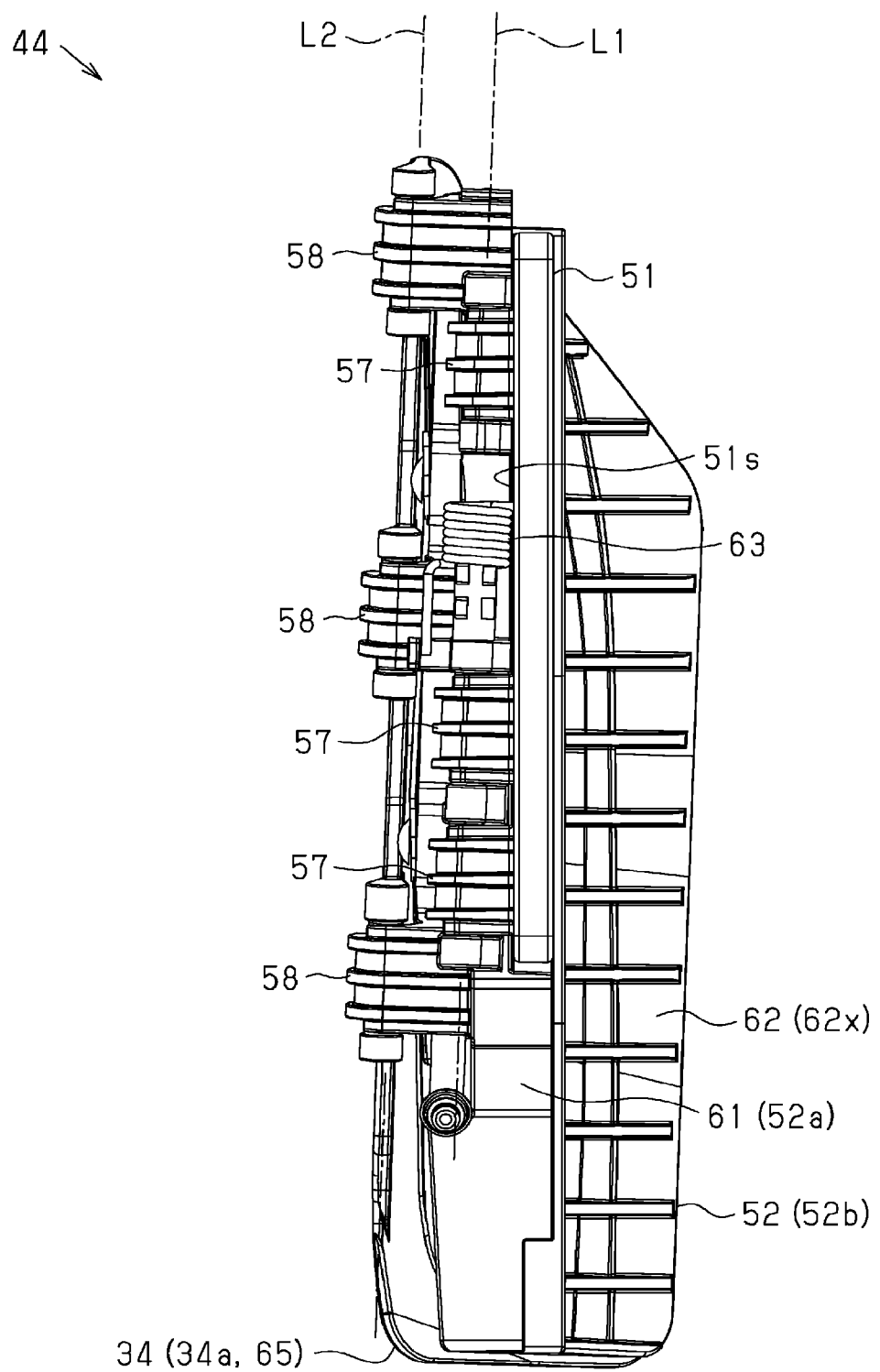
FIG. 6 is a rear view of the BS support assembly shown in FIG. 5.

In further detail, as shown in FIG. 3, in the seat device 20 of the present embodiment, the air packs 10 are fixed to a seat frame F, which serves as a structural body of the seat 1, in a state integrated with paddles 30 (31 to 36), which serve as pressing members, as support assemblies 40 (41 to 46). More specifically, the support assemblies 40 move the paddles 30 when the air packs 10 are inflated or deflated. The support assemblies 40, each serving as a seat support device, are configured to change the seat support form when the paddles 30 press a cushion pad (not shown) at locations where the support assemblies 40 are arranged.

BS Support Assembly

The structure of back side support assemblies 44 (BS support assembly) arranged in the seat 1 of the present embodiment will now be described.

As shown in FIGS. 4 to 9, in the seat device 20 of the present embodiment, the BS support assemblies 44 that correspond to the side portions 3a and 3b of the seat back 3 (refer to FIG. 1) each include a fixed base 51 and a movable base 52. The fixed base 51 is fixed to a side frame 3f of the seat back 3 (refer to FIG. 2). The movable base 52 is pivotally coupled to the fixed base 51. Further, each BS support assembly 44 in the present embodiment includes a paddle 34, which configures a pressing member, pivotally coupled to the movable base 52. The back side support air pack 14 is arranged between the paddle 34 and the movable base 52.

Figure 7:
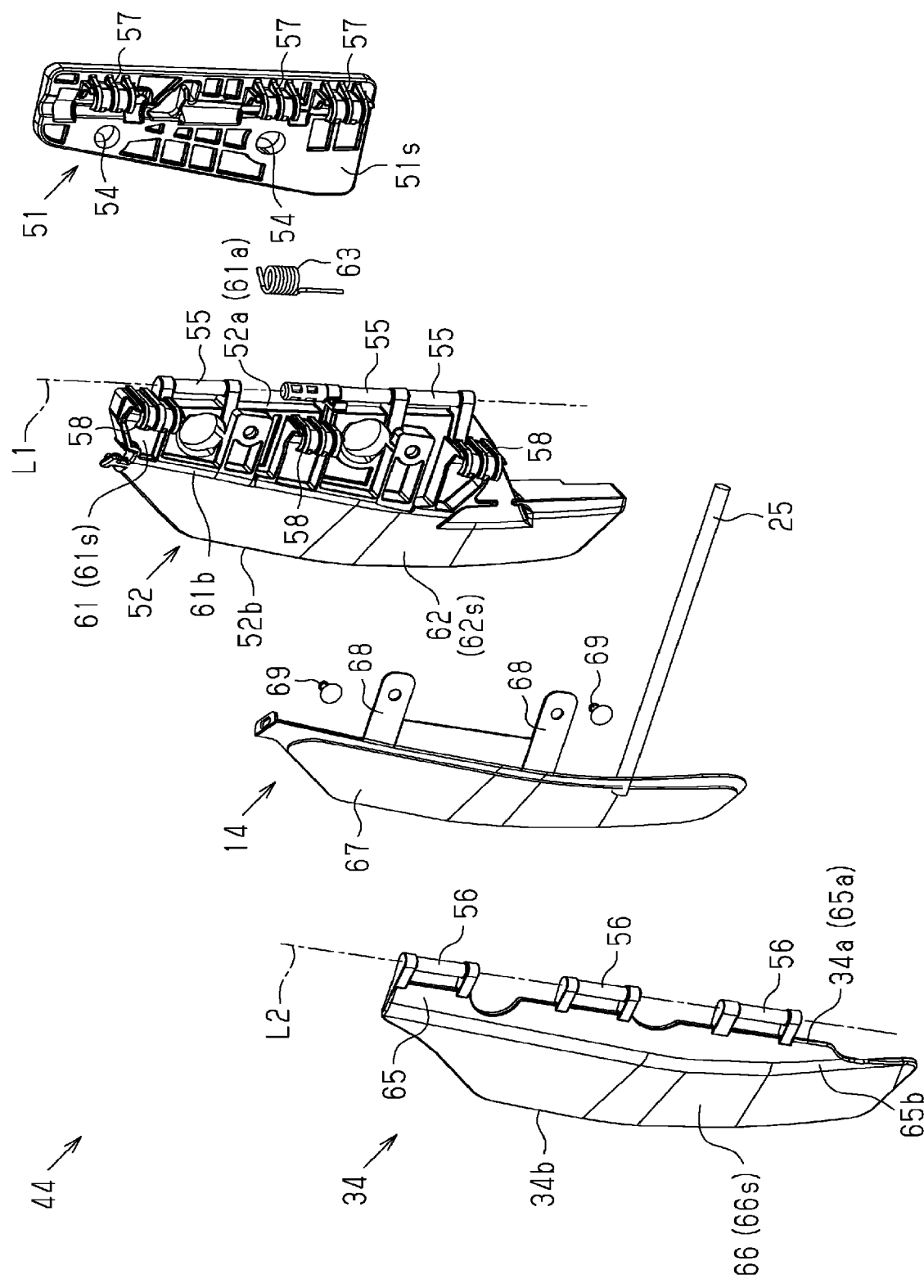
FIG. 7 is an exploded perspective view of the BS support assembly shown in FIG. 5.
Figure 8:
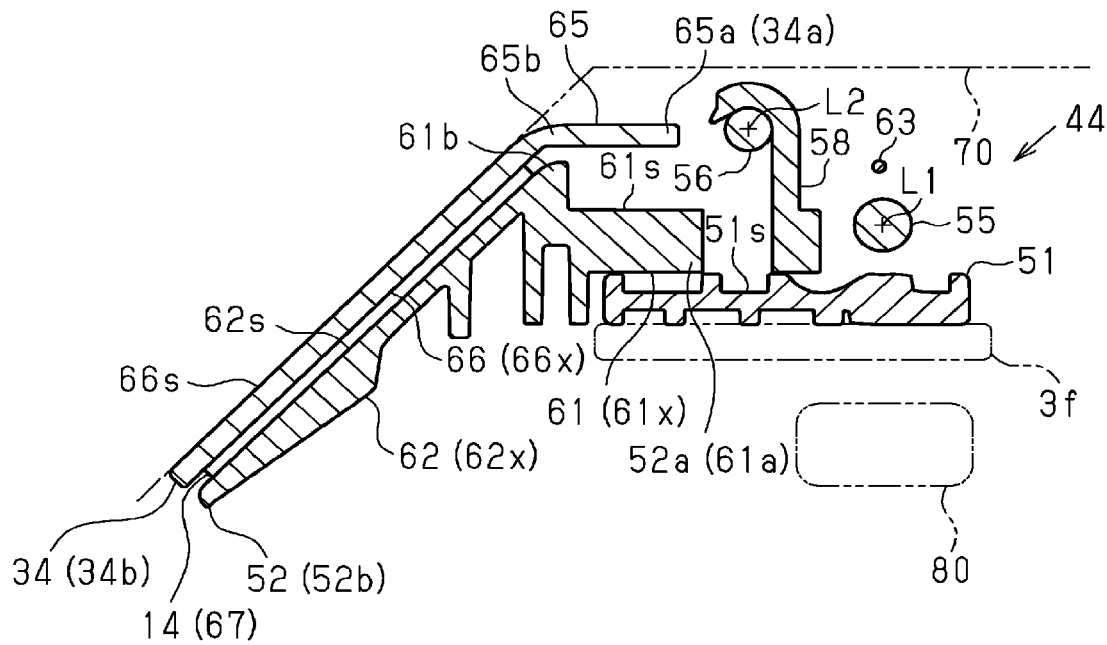
FIG. 8 is a cross-sectional view of the BS support assembly shown in FIG. 5 (cross-section taken along line VIII-VIII in FIG. 5 during air pack deflation).

More specifically, as shown in FIGS. 7 and 8, in each BS support assembly 44 of the present embodiment, the fixed base 51 is a substantially flat plate. Further, the fixed base 51 includes a plurality of bolt insertion holes 54 that extends through the fixed base 51 in a thickness-wise direction. The fixed base 51 in the present embodiment uses the bolt insertion holes 54 to be fastened to the side frame 3f of the seat back 3 from the inner side (upper side in FIG. 8) in a widthwise direction of the seat (refer to FIG. 3).

The movable base 52 is flap-shaped and includes a basal end where shafts 55 are arranged and extend in a longitudinal direction of the movable base 52. The paddle 34 is flap-shaped and includes a basal end 34a where shafts 56 are arranged and extending in a longitudinal direction of the paddle 34. Accordingly, the BS support assembly 44 in the present embodiment is configured in a state in which the fixed base 51, the movable base 52, and the paddle 34 are stacked and coupled in the thickness-wise direction.

Specifically, as shown in FIGS. 5 to 7 and 10, the fixed base 51 in the present embodiment includes hooks 57 that engage the shafts 55 of movable base 52. The hooks 57 project from a front surface 51s of the substantially flat plate fixed base 51. Each of the hooks 57 includes a distal end that is bent back to be substantially U-shaped in conformance with the substantially cylindrical shafts 55 of the movable base 52. In the BS support assembly 44 of the present embodiment, engagement of the shafts 55 and the hooks 57 forms a pivot axis L1 of the movable base 52 relative to the fixed base 51.

Further, as shown in FIGS. 5 to 9 and 11, in the BS support assembly 44 of the present embodiment, the movable base 52 also includes hooks 58 that engage the shafts 56 of the paddle 34. Each hook 58 includes a distal end bent back to be substantially U-shaped in conformance with the substantially cylindrical shafts 56 of the paddle 34. In the BS support assembly 44 of the present embodiment, engagement of the shafts 56 and the hooks 58 forms a pivot axis L2 of the paddle 34 relative to the movable base 52.

More specifically, the movable base 52 in the present embodiment includes a base portion 61 that is a substantially flat plate and an extension portion 62. The base portion 61 includes a first end 61a (refer to FIG. 7, right side in drawing) that is the basal end 52a where the shafts 55 are arranged. The extension portion 62 extends in a state bent from a second end 61b (left side in FIG. 7) at a side opposite to the first end 61a. The hooks 58 project from a front surface 61s of the base portion 61.

As shown in FIGS. 5 to 9, in the BS support assembly 44 of the present embodiment, the second pivot axis L2 about which the paddle 34 pivots relative to the movable base 52 is arranged at a location closer to a distal end 52b of the movable base 52 (refer to FIG. 8, left side in drawing) than the first pivot axis L1 about which the movable base 52 pivots relative to the fixed base 51. Further, the BS support assembly 44 in the present embodiment is configured so that the first pivot axis L1 and the second pivot axis L2 are in a positional relationship (skew positional relationship) in which the second pivot axis L2 is inclined relative to the first pivot axis L1 (refer to FIG. 5).

Further, when the shafts 55 engage the hooks 57 of the fixed base 51, the movable base 52 of the present embodiment is arranged in a state in which the base portion 61 overlaps the fixed base 51 (surface 51s). In such a state, the extension portion 62 extends toward the front of the seat 1 (left side in FIG. 8) and projects outward (from upper side to lower side in FIG. 8) from the inner side in the widthwise direction of the seat.

The BS support assembly 44 in the present embodiment includes a torsion coil spring 63 that is arranged coaxially with the shafts 55 of the movable base 52. In the BS support assembly 44 of the present embodiment, the torsion coil spring 63 functions as a biasing member that pivots the movable base 52 in a direction in which the base portion 61 of the movable base 52 is pressed against the fixed base 51 (refer to FIG. 8, counterclockwise in drawing). This holds the movable base 52 of the present embodiment at a position where a back surface 61x of the base portion 61 is in contact with the surface 51s of the fixed base 51.

In the same manner as the movable base 52, the paddle 34 of the present embodiment includes a base portion 65 that is a substantially flat plate and an extension portion 66. The base portion 65 includes a first end 65a (refer to FIG. 7, right side in drawing) that is the basal end 34a where the shafts 56 are arranged. The extension portion 66 extends in a state bent from a second end 65b (left side in FIG. 7) at a side opposite to the first end 65a. Further, when the shafts 56 engage the hooks 58 of the movable base 52, the paddle 34 is also arranged in a state in which the base portion 65 overlaps the base portion 61 of the movable base 52. In such a state, in the paddle 34 of the present embodiment, the extension portion 66 is arranged in a state overlapping the extension portion 66 of the movable base 52 that extends outward (refer to FIG. 8, lower side in drawing) and toward the front of the seat 1 (left side in FIG. 8) from the inner side in the widthwise direction of the seat.

Figure 9:
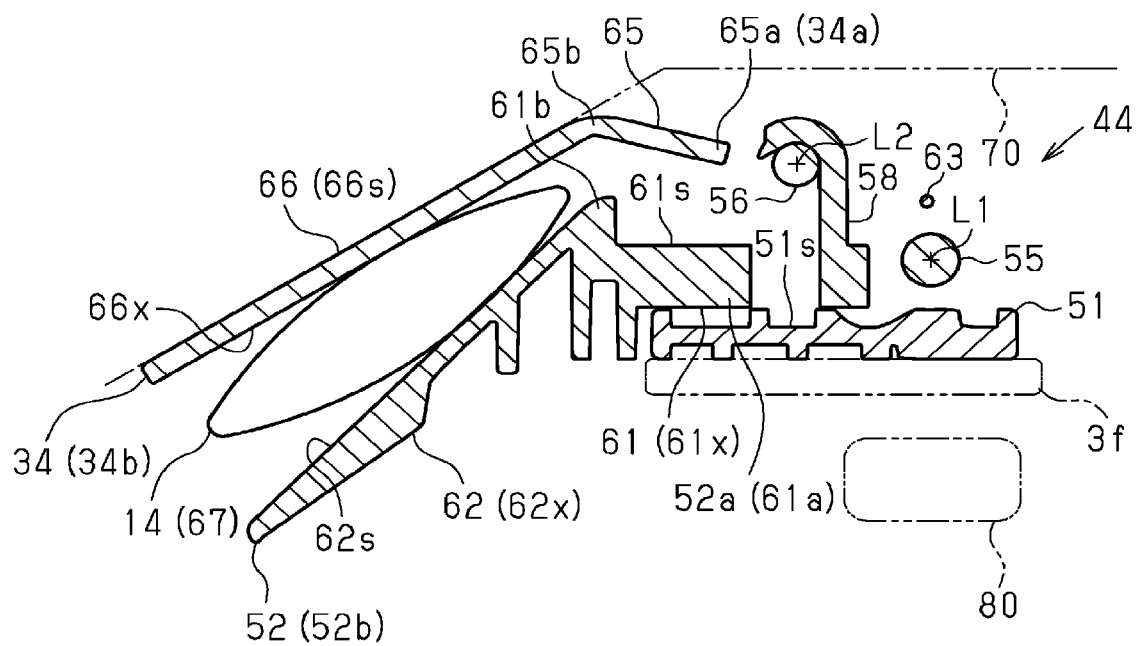
FIG. 9 is a cross-sectional view of the BS support assembly shown in FIG. 5 (cross-section taken along line VIII-VIII in FIG. 5 during air pack inflation).
Figure 10:
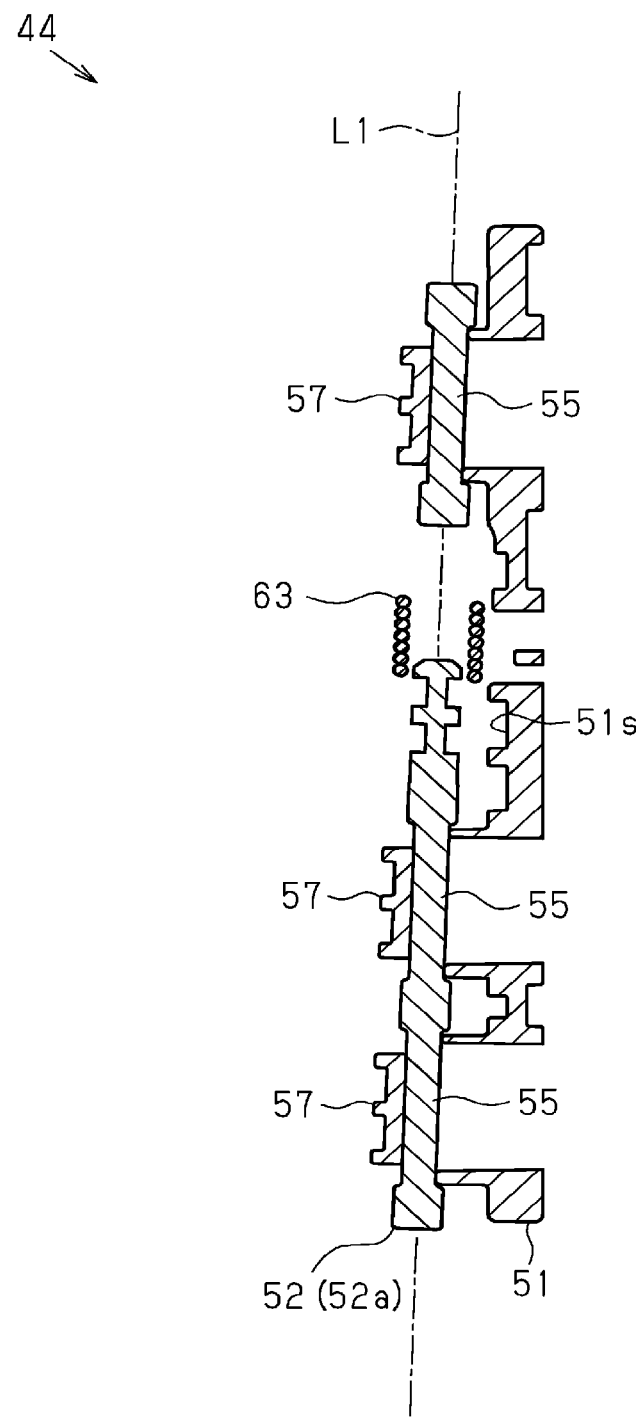
FIG. 10 is a cross-sectional view of the BS support assembly shown in FIG. 5 (cross-section taken along line X-X in FIG. 5).
Figure 11:
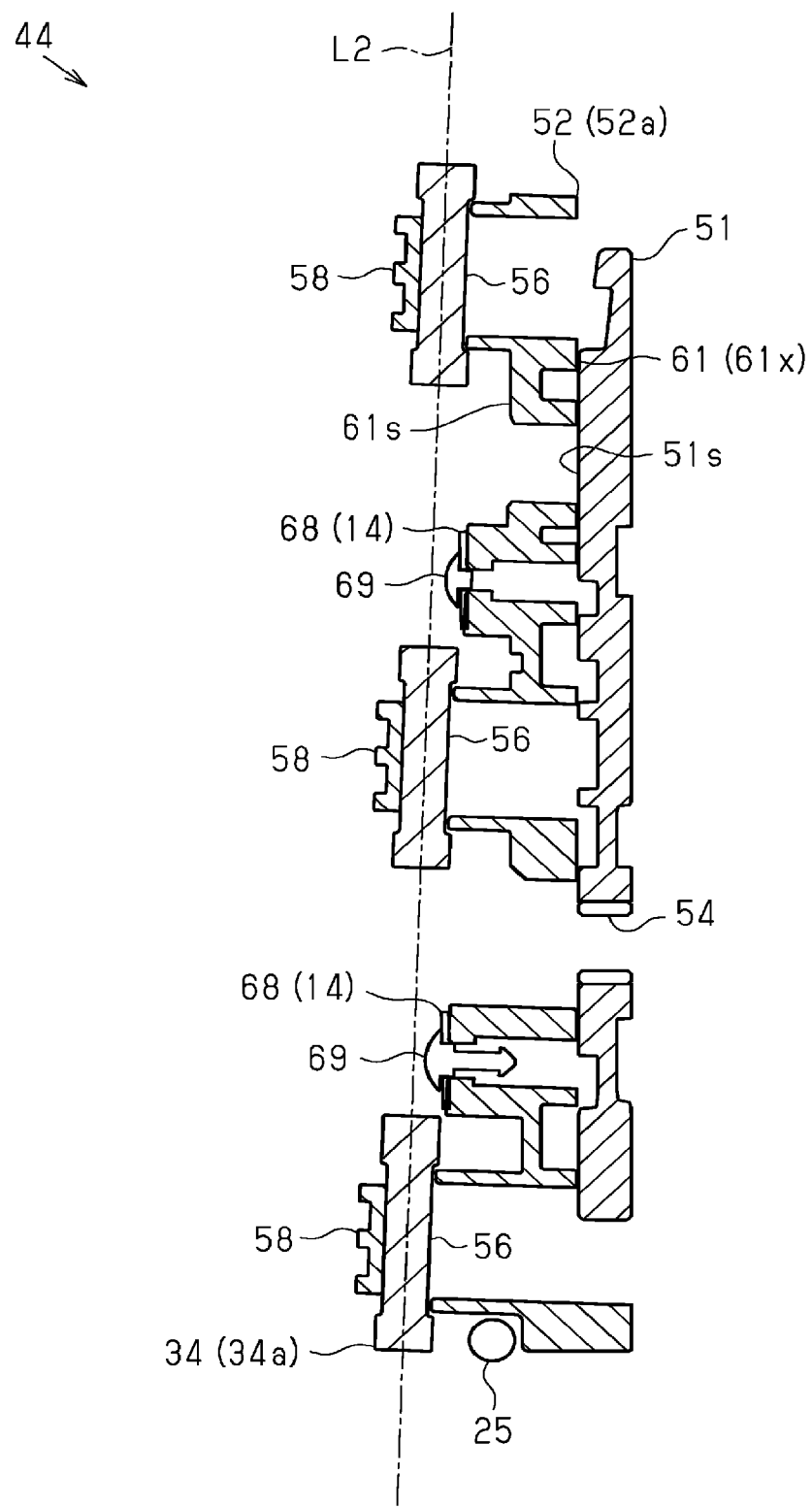
FIG. 11 is a cross-sectional view of the BS support assembly shown in FIG. 5 (cross-section taken along line XI-XI in FIG. 5).

As shown in FIGS. 7 to 9, each of the back side support air packs 14 has a pack portion 67 that includes two straps 68 extending from an end of the pack portion 67. The pack portion 67 is set to be flat when deflated to conform to the shapes of the extension portions 62 and 66 of the movable base 52 and the paddle 34. The air pack 14 of the present embodiment is configured so that the pack portion 67 is arranged between the extension portion 62 of the movable base 52 and the extension portion 66 of the paddle 34 in a state in which a clip 69 fixes each of the straps 68 to the base portion 61 of the movable base 52.

As shown in FIGS. 8 and 9, in the BS support assembly 44 of the present embodiment, inflation and deflation of the air pack 14, which is arranged between the paddle 34 and the movable base 52, pivots the paddle 34 about the second pivot axis L2 relative to the movable base 52. More specifically, when filled with air and inflated, the air pack 14 presses the extension portion 62 of the movable base 52 (front surface 62s) and the extension portion 66 of the paddle 34 (back surface 66x), which are in contact with the air pack 14. However, the back surface 61x of the base portion 61 is in contact with the front surface 61s of the fixed base 51. This restricts pivoting of the movable base 52 in a direction in which the air pack 14 presses the movable base 52 (counterclockwise in FIGS. 8 and 9). Accordingly, the BS support assembly 44 of the present embodiment is configured so that the paddle 34 pivots in a direction in which the air pack 14 presses the paddle 34 (clockwise in FIGS. 8 and 9).

Thus, when the air pack 14 presses and pivots the paddle 34, a distal end 34b of the paddle 34 moves toward the inner side in the widthwise direction of the seat (upper side in FIGS. 8 and 9). Further, in this case, the paddle 34 is arranged at a location where the extension portion 66 (front surface 66s) presses a cushion pad 70, which is arranged at the inner side of a seat surface is (refer to FIG. 1), from the outer side in the widthwise direction of the seat (lower side in FIGS. 8 and 9). This allows the BS support assembly 44 in the present embodiment to change the seat support form of the side portions 3a and 3b of the seat back 3.

Figure 12:
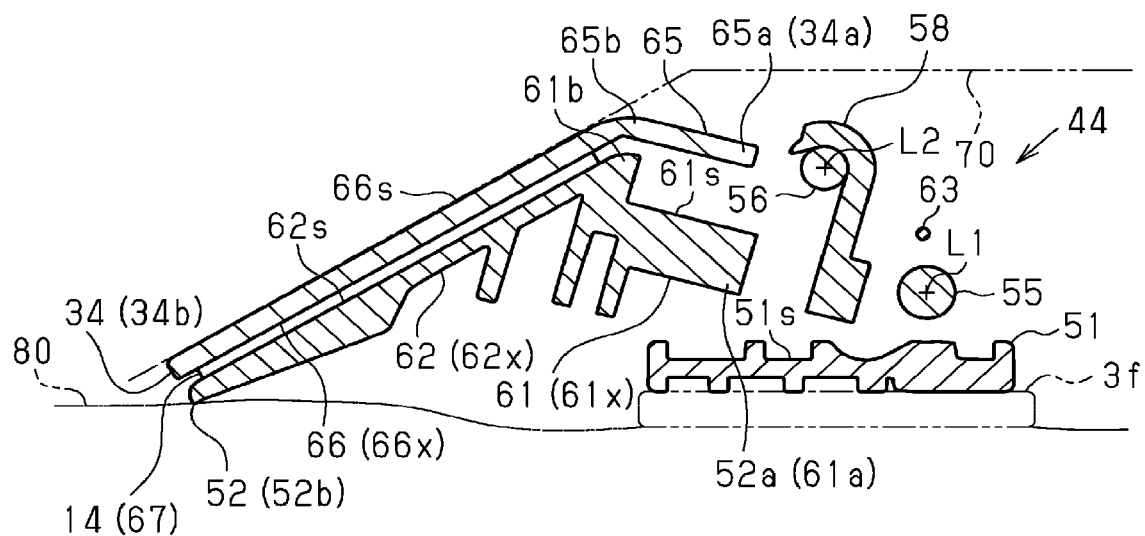
FIG. 12 is a cross-sectional view of the BS support assembly shown in FIG. 5 (cross-section taken along line VIII-VIII in FIG. 5 during side airbag deployment).

As shown in FIGS. 8, 9, and 12, the seat 1 in the present embodiment includes a side airbag 80 at a location outward in the widthwise direction of the seat from the BS support assembly 44, which is fixed to the side frame 3f of the seat back 3. When an inflator (not shown) generates gas during a vehicle collision, the side airbag 80 is configured to be expanded and deployed toward the front of the seat 1 (left side in FIGS. 8, 9 and 12) from a side edge of the seat back 3.

When the side airbag 80 is not deployed, the BS support assembly 44 in the present embodiment includes the movable base 52 (the extension portion 66) extending outward from the inner side in the widthwise direction of the seat toward the front of the seat 1. The distal end 52b of the movable base 52 is arranged at a location outward from the side frame 3f of the seat back 3 in the widthwise direction of the seat. That is, when the side airbag 80 is deployed, the distal end 52b of the movable base 52 is arranged at a location where the expanding side airbag 80 presses a back surface 62x of the extension portion 62 on the movable base 52. In this case, the movable base 52 is pivoted about the first pivot axis L1 (refer to FIG. 12, clockwise in drawing) relative to the fixed base 51 by the pressing force of the side airbag 80 against the biasing force of the torsion coil spring 63. This moves the distal end 52b of the movable base 52, which is arranged forward from the side airbag 80, toward the inner side in the widthwise direction of the seat. Accordingly, the BS support assembly 44 in the present embodiment allows for deployment of the side airbag 80.

The above embodiment has the advantages described below.

(1) The BS support assembly 44 includes the fixed base 51, the movable base 52, the paddle 34, and the air pack 14. The fixed base 51 is fixed to the side frame 3f of the seat back 3. The movable base 52 is pivotally coupled to the fixed base 51. The paddle 34 is pivotally coupled to the movable base 52. The air pack 14 is inflated and deflated between the paddle 34 and the movable base 52. When the side airbag 80 arranged in the seat 1 is deployed, the expanding side airbag 80 presses and pivots the movable base 52 and allows for deployment of the side airbag 80. Further, the air pack 14 presses and pivots the paddle 34 to change the seat support form of the side portions 3a and 3b of the seat back 3. With the BS support assembly 44, the pivot axis L1 of the movable base 52 relative to the fixed base 51 and the pivot axis L2 of the paddle 34 relative to the movable base 52 are arranged at different locations.

With the above structure, the optimal pivot axis L1 can be set for the movable base 52 so that the movable base 52 pivots without interfering with the deployment action of the side airbag 80. Further, the optimal pivot axis L2 of the paddle 34 can be set to change the seat support form. This ensures quick and smooth deployment action of the side airbag 80 and adjusts the seat support in a further preferred manner.

(2) The second pivot axis L2 about which the paddle 34 pivots relative to the movable base 52 is arranged at a location closer to the distal end 52b of the movable base 52 than the first pivot axis L1 about which the movable base 52 pivots relative to the fixed base 51.

In the above structure, the movable base 52 is greatly moved so as not to interfere with the deployment action of the side airbag 80, and the paddle 34 is moved further finely.

This ensures quick and smooth deployment action of the side airbag 80 and adjusts the seat support form in a further preferred manner.

(3) The BS support assembly 44 includes the torsion coil spring 63 arranged coaxially with the shafts 55 of the movable base 52, that is, the pivot axis L1 of the movable base 52 relative to the fixed base 51. The torsion coil spring 63 functions as a biasing member that pivots the movable base 52 in the direction in which the movable base 52 is pressed against the fixed base 51, that is, in the direction (refer to FIG. 8, counterclockwise in drawing) opposite to a direction in which the side airbag 80 presses and pivots the movable base 52.

In the above structure, for example, even when the backrest surface 3s of the seat back 3 is manually pulled toward the front thereby pivoting the movable base 52 in the same direction as when the side airbag 80 is deployed, the biasing force (elastic resiliency) of the torsion coil spring 63 returns the movable base 52 to its original position. As a result, high reliability and a high quality are obtained.

Further, the torsion coil spring 63, which is arranged coaxially with the pivot axis L1 of the movable base 52, is used as the biasing member so that the torsion coil spring 63 does not interfere with the deployment of the side airbag 80. This ensures quick and smooth deployment action of the side airbag 80. Additionally, this reduces the layout area of the torsion coil spring 63. Accordingly, the BS support assembly 44 can be reduced in size.

(4) The movable base 52 is held by the biasing force of the torsion coil spring 63 at a location where the base portion 61 (back surface 61x) is in contact with the fixed base 51 (front surface 51s).

The above structure restricts the pivoting of the movable base 52 by the pressing force of the inflating air pack 14. This efficiently pivots the paddle 34 with the pressing force of the inflating air pack 14. As a result, the seat support form is adjusted in a further preferred manner.

The above embodiment may be modified as described below.

In the above embodiment, the present invention is embodied in the back side support assemblies (BS support assemblies 44) that change the seat support form of the side portions 3a and 3b of the seat back 3. However, when side airbags are arranged in the seat cushion 2, the present invention may be applied to cushion side support assemblies (CS support assemblies) 46 that change the seat support form of the side portions 2a and 2b.

In the above embodiment, the torsion coil spring 63, which is arranged coaxially with the pivot axis L1 of the movable base 52, is used as the biasing member that pivots the movable base 52. However, the type and location of the biasing member are not limited and may be changed. The present invention may be applied to a structure that does not include such a biasing member.

In the above embodiment, the fixed base 51 is fixed to the side frame 3f of the seat back 3. However, the structural body of the seat 1 to which the fixed base 51 is fixed may be changed.

The fixed base 51, the movable base 52, and the paddle 34 may have any shape.

In the above embodiment, the pivot axis L1 of the movable base 52 (first pivot axis) and the pivot axis L2 of the paddle 34 (second pivot axis) are configured to have a positional relationship (skew positional relationship) in which the pivot axis L1 and the pivot axis L2 are inclined. However, the first and second pivot axis L1 and L2 may be parallel to each other. The present invention is not restrictive to a structure in which the second pivot axis L2 is arranged at a location closer to the basal end 52a of the movable base 52 than the first pivot axis L1.

The invention claimed is:

1. A vehicle seat device, comprising:
a fixed base fixed to a structural body of a seat;
a movable base pivotally coupled to the fixed base;
a paddle pivotally coupled to the movable base; and
an air pack inflated and deflated between the movable base and the paddle, wherein
when a side airbag arranged in the seat is deployed, the expanding side airbag presses and pivots the movable base and allows for a deployment of the side airbag,
the paddle is configured to change a seat support form when pressed and pivoted by the air pack,
the movable base pivots about a first pivot axis relative to the fixed base,
the paddle pivots about a second pivot axis relative to the movable base, and
the first pivot axis and the second pivot axis are arranged at different locations.

2. The vehicle seat device according to claim 1, wherein the second pivot axis is arranged at a location closer to a distal end of the movable base than the first pivot axis.

3. The vehicle seat device according to claim 1, further comprising:
a biasing member;
wherein the biasing member biases the movable base in a direction opposite to a direction in which the side airbag presses and pivots the movable base.

4. The vehicle seat device according to claim 3, wherein the biasing member is a torsion coil spring that is arranged coaxially with the first pivot axis.

5. The vehicle seat device according to claim 3, wherein the movable base is held by a biasing force of the biasing member at a location contacting the fixed base.

* * * * *